US010623725B2

(12) United States Patent
Lau et al.

(10) Patent No.: US 10,623,725 B2
(45) Date of Patent: Apr. 14, 2020

(54) 3D GLASSES INCORPORATING REAL-TIME TRACKING

(71) Applicant: VOTANIC Ltd., Hong Kong (CN)

(72) Inventors: Ying Kei Henry Lau, Hong Kong (CN); Kin Yip Chan, Hong Kong (CN); Wai Lam Tam, Hong Kong (CN); Ka Tsun Adrian Ng, Hong Kong (CN); Hing Tobey Ko, Hong Kong (CN)

(73) Assignee: VOTANIC LTD., Hong Kong (CN)

( * ) Notice: Subject to any disclaimer, the term of this patent is extended or adjusted under 35 U.S.C. 154(b) by 43 days.

(21) Appl. No.: 16/117,810

(22) Filed: Aug. 30, 2018

(65) Prior Publication Data

US 2019/0208189 A1 Jul. 4, 2019

Related U.S. Application Data

(60) Provisional application No. 62/613,227, filed on Jan. 3, 2018.

(51) Int. Cl.
*G06F 3/01* (2006.01)
*H04N 13/366* (2018.01)
(Continued)

(52) U.S. Cl.
CPC .......... *H04N 13/366* (2018.05); *G06F 3/011* (2013.01); *H04N 13/337* (2018.05);
(Continued)

(58) Field of Classification Search
CPC .. H04N 13/366; H04N 13/337; H04N 13/398; H04N 2213/001; H04N 2213/008; H04N 13/341; G06F 3/011
(Continued)

(56) References Cited

U.S. PATENT DOCUMENTS

| 2012/0056876 A1* | 3/2012 | Lee | H04N 13/122 345/419 |
| 2012/0062551 A1* | 3/2012 | Lee | H04N 13/122 345/419 |

(Continued)

OTHER PUBLICATIONS

Grubert et al, A survey of calibration methods for optical see-though head mounted display (Year: 2018).*

*Primary Examiner* — Shan E Elahi
(74) *Attorney, Agent, or Firm* — Leason Ellis LLP

(57) ABSTRACT

A 3D glasses device incorporating real time tracking and a system for implementing the 3D glasses device for an immersive virtual reality experience includes 3D glasses that comprise: a frame, a pair of lens, and a real-time tracking unit, which enables the position and orientation to be observed by optical tracking systems featuring optical transmitters. In one exemplary implementation the 3D glasses device communicates with a client system during a session of digital media content rendering. The real-time tracking unit of the 3D glasses device has optical sensors activated when struck by light from an optical transmitter, communicates its position and orientation to the client system, which renders media content based in part on the tracking data, and shows the content on head-mounted display systems that are part of the device in order to produce an immersive virtual reality experience.

21 Claims, 11 Drawing Sheets

(51) Int. Cl.
*H04N 13/337* (2018.01)
*H04N 13/398* (2018.01)
*H04N 13/341* (2018.01)

(52) U.S. Cl.
CPC ......... *H04N 13/341* (2018.05); *H04N 13/398* (2018.05); *H04N 2213/001* (2013.01); *H04N 2213/008* (2013.01)

(58) Field of Classification Search
USPC .......................................................... 348/53
See application file for complete search history.

(56) References Cited

U.S. PATENT DOCUMENTS

| | | | |
|---|---|---|---|
| 2014/0098009 A1* | 4/2014 | Prest .................. | G02B 27/0176 345/8 |
| 2014/0159995 A1* | 6/2014 | Adams ..................... | G02C 5/16 345/8 |
| 2014/0218269 A1* | 8/2014 | Cazalet .............. | G02B 27/0176 345/8 |
| 2014/0253589 A1* | 9/2014 | Tout ................. | G06K 19/06159 345/633 |
| 2015/0124086 A1* | 5/2015 | Melle ................... | G01B 11/002 348/136 |
| 2015/0156196 A1* | 6/2015 | Kim ........................ | G06F 21/32 345/156 |
| 2017/0163970 A1* | 6/2017 | Gronholm ............ | H04N 13/344 |

* cited by examiner

Placement of Aperture in Mask Architecture

Placement of Aperture in Plug Architecture

3D GLASSES INCORPORATING REAL-TIME TRACKING

CROSS REFERENCE TO RELATED APPLICATION

The present application claims priority to and the benefit of U.S. provisional patent application No. 62/613,227, filed Jan. 3, 2018, which is hereby incorporated by reference in its entirety.

FIELD OF THE INVENTION

One or more present embodiments described herein are directed to three-dimensional ("3D") enabled devices having optical sensors integrated therein and used to determine the position of the user(s) wearing the device so they can be tracked in real time.

BACKGROUND OF THE INVENTION

Virtual reality creates a simulated physical presence for the user inside a computer-generated three-dimensional environment. In general, the hardware of a virtual reality system consists of components, such as display screens, tracking devices and a high-performance computer to produce a high-level immersion experience for the user. By tracking the changes in the user's movement around the environment, virtual reality systems produce the feeling in the user of being immersed in the environment by making corresponding changes in the user's fields of vision, thus ensuring the computer-generated virtual environment is both realistic and enjoyable.

Conventionally, the computer-generated virtual environment is projected stereoscopically onto (multiple) big screens. The user experiences the three-dimensional environment by simply wearing a pair of translucent stereoscopic 3D glasses. The immersion, in this case, is achieved by employing an expensive optical tracking system. Conventional virtual reality system, as described herein, require tremendous investment in the hardware components, and have been found to be difficult to market to average users.

Thus, what is needed in the art are apparatus, systems and methods that allow for the cost-effective development of interactive environments.

The advancement of technology in recent years has seen new opportunities that allow virtual reality systems to venture into the home user market with the introduction of a new interactive immersive experience powered by head-mounted displays ("HMD"). Having various sensors built-in to the HMD body, the user wearing the HMD can be tracked by tracking the position and orientation of the head-mounted display. Also, the rendered stereoscopic 3D environment can be projected directly onto the eyes of the user, covering the entirety of the user's field of view and creating a high level of immersion at a much lower cost. Despite being priced much more favorably, the market response to the HMD-powered virtual reality system has been underwhelming. As a result of needing to incorporate the sensor components and an integral display screen into a single product, the HMD is bulky and uncomfortable when the user moves around the virtual reality environment wearing it. In addition, with the HMD covering the user's entire field of view, movement without knowledge of the external environment has raised great safety concerns from people who are skeptical about trying such a virtual reality experience.

Thus, what is further needed in the art is a system, apparatus, and method that overcomes the deficiencies in usability and cost found in the existing prior art.

It is in this context that embodiments of the invention arise.

SUMMARY OF THE INVENTION

In one or more particular implementations, a 3D glasses device is provided, where the device includes a head mounted display and incorporates one or more optical sensors that work in conjunction with an optical tracking system, such as one or more optical transmitters, to track the movements of a wearer.

In a further implementation, the 3D glasses device enables the user to see computer generated 3D and/or two-dimensional ("2D") content. For instance, the user wearing such a 3D glasses device is able to perceive image and/or video content differentiated from those non-3D glass wearers in various immersive virtual reality implementations. By way of non-limiting example, through the use of the 3D glasses devices described, users are able to experience immersive virtual reality implementations that include, but are not limited to, cave automatic virtual environment ("CAVE") and projection-based systems with one or more walls, projection domes, or any other projection surfaces.

In a still further configuration of the devices described herein, the 3D glasses device is in communication with and receives data from one or more processors so as to create a variety of virtual reality experiences customized for a particular user and/or a particular environment.

In a further implementation, systems are provided for creating a 3D glasses device having the capability to understand its position and orientation in a physical space, and various implementations for developing a system for creating an immersive virtual reality experience based on the device.

BRIEF DESCRIPTION OF THE DRAWINGS

The present invention may be best understood by reference to the following detailed description taken in conjunction with the accompany drawings, wherein.

DETAILED DESCRIPTION OF EXEMPLARY EMBODIMENTS

By way of broad overview and introduction, in a particular configuration of the 3D glasses or head mounted display devices described herein, a head mounted display system incorporates real time tracking capability through sensors located on the 3D glasses device, enabling the movement of one or more individual users to be tracked within a virtual reality environmental volume. Such movement tracking enables the described system to create, using code executed within one or more processors, high level immersive virtual reality experiences. Importantly, the described systems and methods provide for the generation of virtual reality environments without the need for additional tracking components attached to the 3D glasses or head mounted display devices. In one or more implementations, such an immersive virtual environment is produced by one or more processors or computers analyzing the real-time tracking data generated from the interaction between the optical sensors incorporated into or attached to the 3D glasses and one or more external optical transmitters. Properly configured processors allow for the position, orientation, and movements of the 3D glasses device to be deduced, thus allowing the virtual reality system to dynamically generate content within the virtual environment volume based on such movements.

Particular implementations of the 3D glasses or head mounted display system, method and apparatus described herein are illustrated in accompanying FIGS. 1A-5B. As shown with particular reference to FIGS. 1A and 1B, the 3D glasses of one or more particular configurations include real-time tracking. Such described 3D glasses may also include one or more of the following features: passive polarizing lens; active shutter lens featuring Digital Light Processing ("DLP") Link synchronization; and active shutter lens featuring VESA Stereo radio frequency synchronization. In each potential configuration, each of the 3D glasses works in conjunction with a display system using either or both passive polarizing stereoscopic display (360 in FIG. 3B) and active shutter stereoscopic display. In a further configuration, the 3D glasses of the described configuration employ one of the following synchronization methods: VESA Stereo and DLP Link. With these arrangements the lenses over the left and right eyes received slightly different images by operation of the shutters or active polarization so as to give a 3D experience. In an alternative configuration, the 3D glasses do not use any synchronization methods.

Figure 1A:
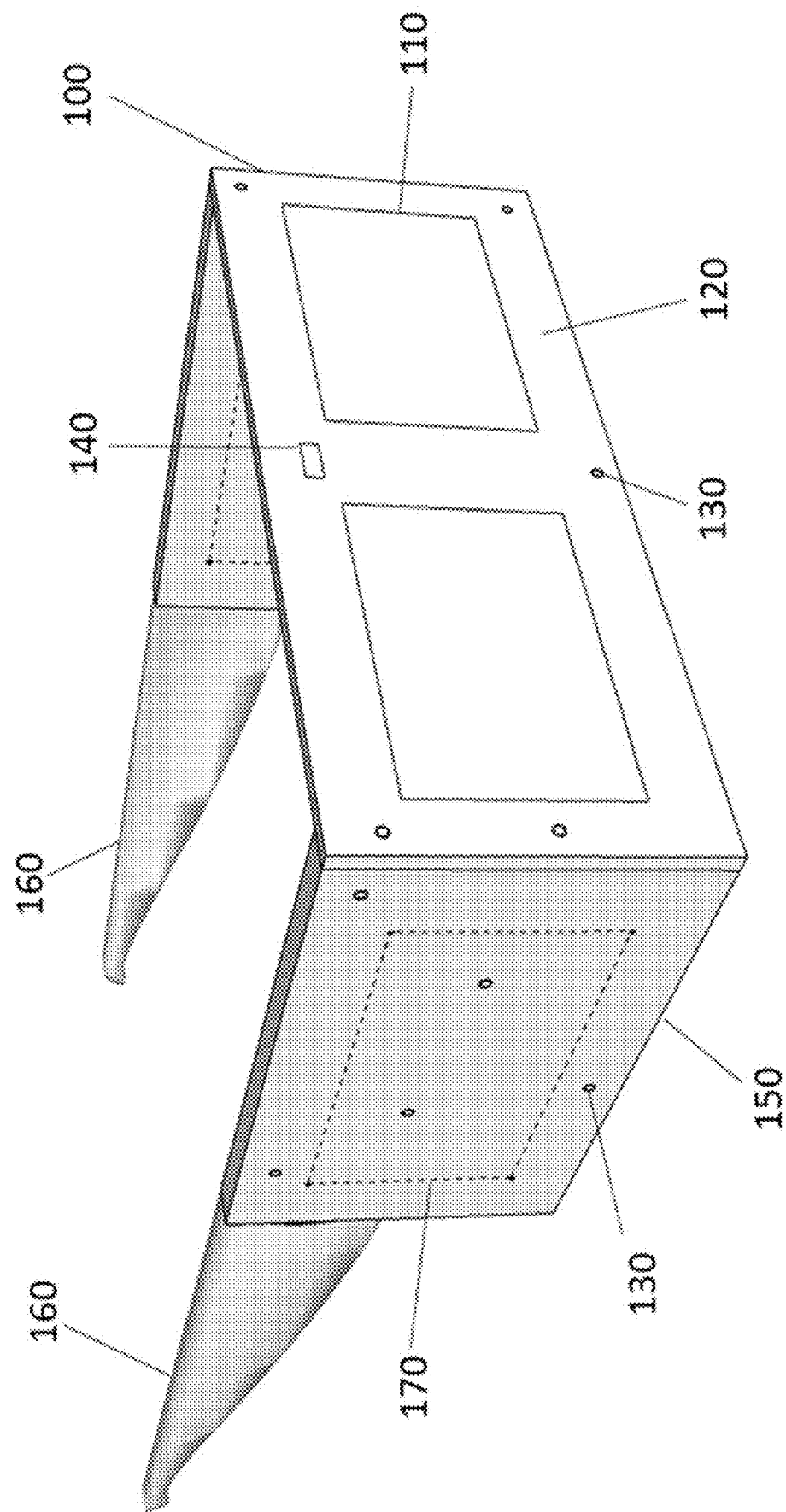
FIG. 1A illustrates a perspective view of an exemplary embodiment of a 3D glasses device implementing a head-mounted display and having built-in optical sensors.

As shown in detail with respect to FIG. 1A, an exemplary embodiment of the head mounted, or 3D glasses display device is provided. For ease of description, the foregoing components shall be described with particular reference to a 3D glasses device. However, the present invention can include additional form factors, such as monocles, head mounted displays, screens and the like, whether or not provided in glasses form.

Figure 1C:
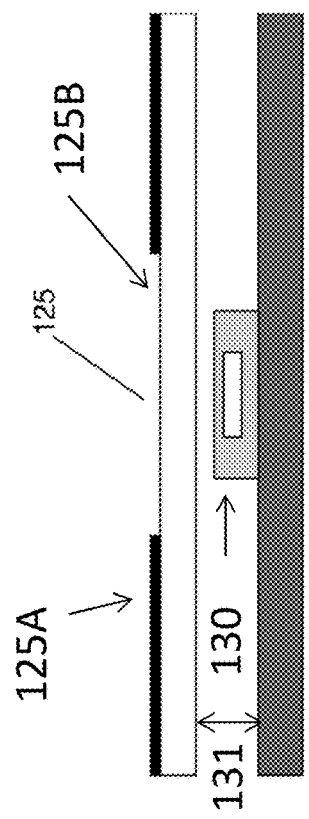
FIG. 1C illustrates exemplary placements of a mask architecture covering on top of an optical sensor according to a particular embodiment the 3D glasses device described herein.

In one particular implementation, the 3D glasses device 100 includes a pair of lenses 110 for 3D viewing, a frame including a front face cover 120, side covers 150 and a component featuring some form of one or more glasses securement component(s) or mechanism. In one particular implementation, the glasses securement component is a pair of earpieces 160, as shown in FIG. 1A. In an alternative configuration, as shown in FIG. 1D, the glasses securement component or mechanism can feature earpieces 160 having a strap or band 180 connecting the earpieces 160. In yet another alternative configuration, as shown in FIG. 1E, the glasses securement component or mechanism can simply be a supportive strap or band 190 connected directly to the side covers 150.

In one particular implementation, the frame supports and shelters all the components of the glasses and a series of optical sensors 130 for tracking of the position of the glasses device with optical transmitters. In one or more particular implementations, the 3D glasses device 100 further includes a DLP Link 3D signal sensor 140 for synchronizing with a display system emitting DLP Link pulses to synchronize a 3D signal input.

In one or more implementations, the 3D glasses are calibrated by one or more calibration modules. In one implementation, the modules are provided as code configured to be executed on one or more processors. For instance, a software application configured as code executed by a processor (e.g. a calibration software application running on processor 305 in FIG. 3B) analyses tracking data produced by one or more external optical tracking system(s) and automatically calibrates the 3D glasses device 100 to correctly operate in the volume delineated by such an external optical tracking system. In one particular implementation, the processor is the same processor configured to execute code as a series of modules for the client system 305. In a further implementation, the processor here is a different one than the processor 305 of the client system or is multiple processors.

In one or more non-limiting implementations, the calibration software modules or application configures the processor (such as processor 305, another processor or a plurality of processors) to manually or automatically access or download newer versions of the application or new media content to be used alongside or in connection with the 3D glasses based virtual reality system. For example, a user is able to access from one or more remote network storage locations new content, code or materials. In a further implementation, the processor is configured to access new content, code or materials as they become available by a service provider of the 3D glasses and/or an authorized third-party content creator of such media content.

In a further configuration, the calibration software modules are configured to store the configuration of the 3D environment in the client system. In a further iteration, the memory of the 3D glasses device is configured to store the configuration of the device itself. In a particular implementation, the calibration module provides a configuration which needs to be calibrated for accurate tracking.

In yet a further implementation, the calibration modules or software for the 3D glasses calibrates the configuration of the sensors so the 3D glasses can obtain accurate absolute tracking data. In another configuration, the calibration modules or software are implemented by a processor of the client systems in order to calibrate the absolute tracking data obtained from the 3D glasses with the pre-defined environment of the VR space, so the 3D glasses can have an acceptable relative tracking data that's aligned to the physical environment As further illustrated by FIG. 1A, the pair of lens 110 are affixed onto the front face cover 120 with a slot or adhesive, or other attachment mechanism. The use of material for the lens depends on the type of display system used. By way of non-limiting example, the 3D glasses work in conjunction with a passive stereoscopic display system, i.e. a display system employing polarized filters to create the illusion of stereoscopic images. As described herein, such a system uses lens made of polarized glasses or other materials that filter out light from a certain direction. Depending on the display system used in connection with the 3D glasses, a pair of circular polarizer lens or a pair of linear polarizer lens are employed to create the desired passive stereoscopic effect. In a further embodiment, the 3D glasses work in conjunction with an active shutter stereoscopic display system, i.e. a display system that alternates between displaying frames meant for the left eye and the right eye so as to create the illusion of stereoscopic images. Those possessing an ordinary level of skill in the requisite art will appreciate that with such an active shutter system, a Liquid Crystal Display ("LCD") can be used as lens.

Returning to FIG. 1A, the front face cover 120 shields the internal components of the 3D glasses 100 from the physical environment. For example, the cover 120 protects the sensor components from physical events such as impact, dust ingression, moisture ingression, and electrostatic discharge. In a further implementation, the front face cover 120 covers the optical sensors 130 mounted on the 3D glasses. Such a cover may prevent induced noise and malfunction of the sensors caused by contact with fingers or other objects. Here, individual optical sensors are positioned directly under an aperture 125 formed from an infrared transparent material as displayed in FIG. 1C.

Figure 1B:
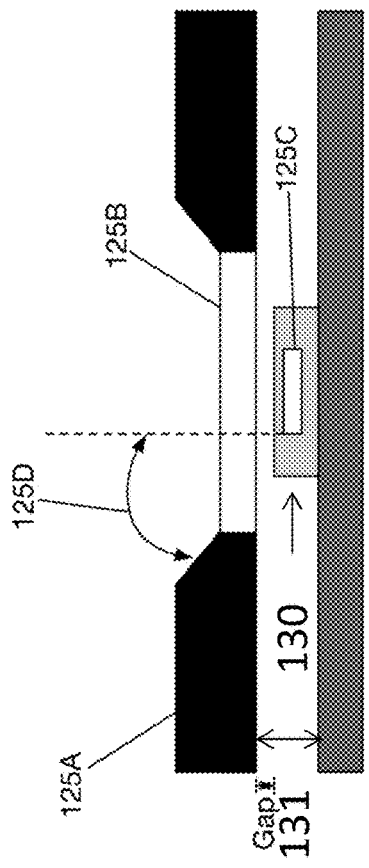
FIG. 1B illustrates exemplary placements of a plug architecture covering on top of an optical sensor according to a particular embodiment of the 3D glasses device described herein.
Figure 1D:
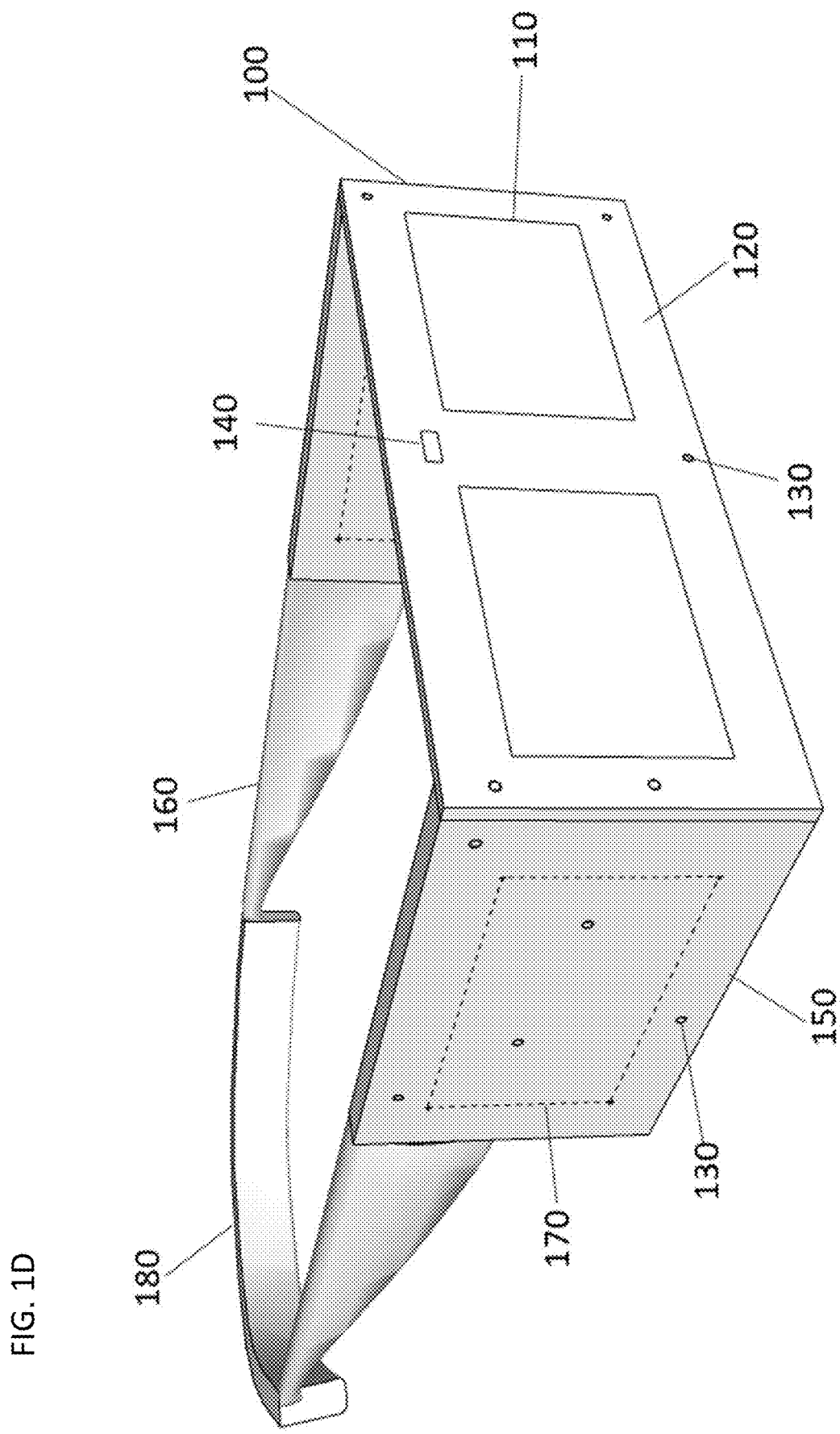
FIG. 1D illustrates a perspective view of an exemplary embodiment of a 3D glasses device implementing a head-mounted display and having the built-in optical sensors, ear pieces and a band for attachment to the user's head.
Figure 1E:
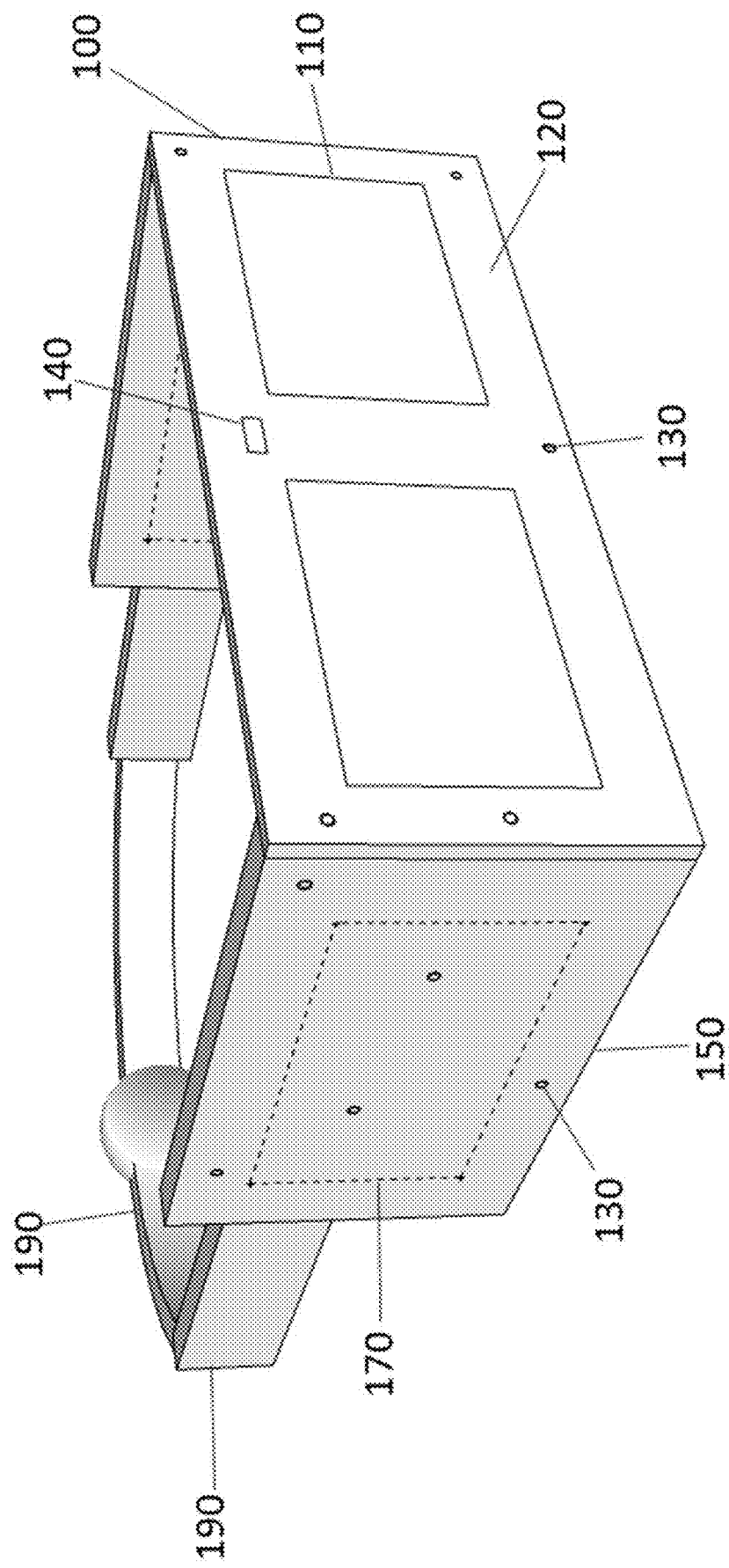
FIG. 1E illustrates a perspective view of an exemplary embodiment of a 3D glasses device implementing a head-mounted display and having the built-in optical sensors and a band for attachment to the user's head.

By way of non-limiting example, the covering of optical sensors 130 can be done using a plug architecture, as shown in FIG. 1B. For instance, the aperture includes an infrared opaque material 125A holding an infrared transparent plug of material 125B. In another implementation, the covering of the sensors 130 is accomplished using a mask architecture, as illustrated in FIG. 1C. Here, the aperture 125 comprises of an infrared opaque material 125A built on top of an infrared transparent material 125B, with physical holes in the sensor locations (not shown). Under both architectures, the sensor covering aperture is placed on top of the physical optical sensor 130, leaving a slight sensor gap between the two objects. By placing the aperture 125 on top of the optical sensor 130 in parallel therewith, the thickness and the opening diameter of the aperture 125 are controlled so the right amount of light can strike on the active area 125C of the optical sensors, making a large angle of incidence 125D, to activate them.

Returning to FIG. 1A, in a further implementation the left side and/or right-side covers(s) may be made to host electric components 170, such as a battery, motion detection module, communication module, processor, etc. The interior of the side cover(s) may also be used to hide the wiring of the 3D glasses 100.

Further, in various configurations, a number of optical sensors 130 are embedded on the inside of either or both the front face cover and the side covers of the 3D glasses. In one particular configuration, the arrangement of sensors 130 can be selected for aesthetic reasons so long as such an arrangement does not interfere with the overall system tracking functionality. Since tracking quality depends on the arrangement of sensors to supply sufficient data for tracking calculation, it may be necessary to add sensors for an aesthetic arrangement. In an alternative arrangement, the positioning of sensors is done in a non-arbitrary manner. For example, the optical sensors 130 are arranged at various positions on the 3D glasses in different orientations, so that enough tracking samples are obtained when the sensors 130 are activated as the optical emitter's light strikes them in any position and orientation of the 3D glasses, so a good level of tracking accuracy can be achieved. The minimum and maximum bounds in the number of optical sensors used on the 3D glasses device depends on the method in which the tracking samples are processed, as well as the bandwidth for which the tracking sample data are transferred to the virtual reality system. As a non-limiting example, the higher amount of tracking sample data needed to establish an accurate tracking, the higher the minimum number of optical sensors 130 required. Likewise, the larger the bandwidth for data transmission, the higher the maximum number of optical sensors 130 that can be used. The actual number of sensors used relates to the needed level of tracking.

Figure 2:
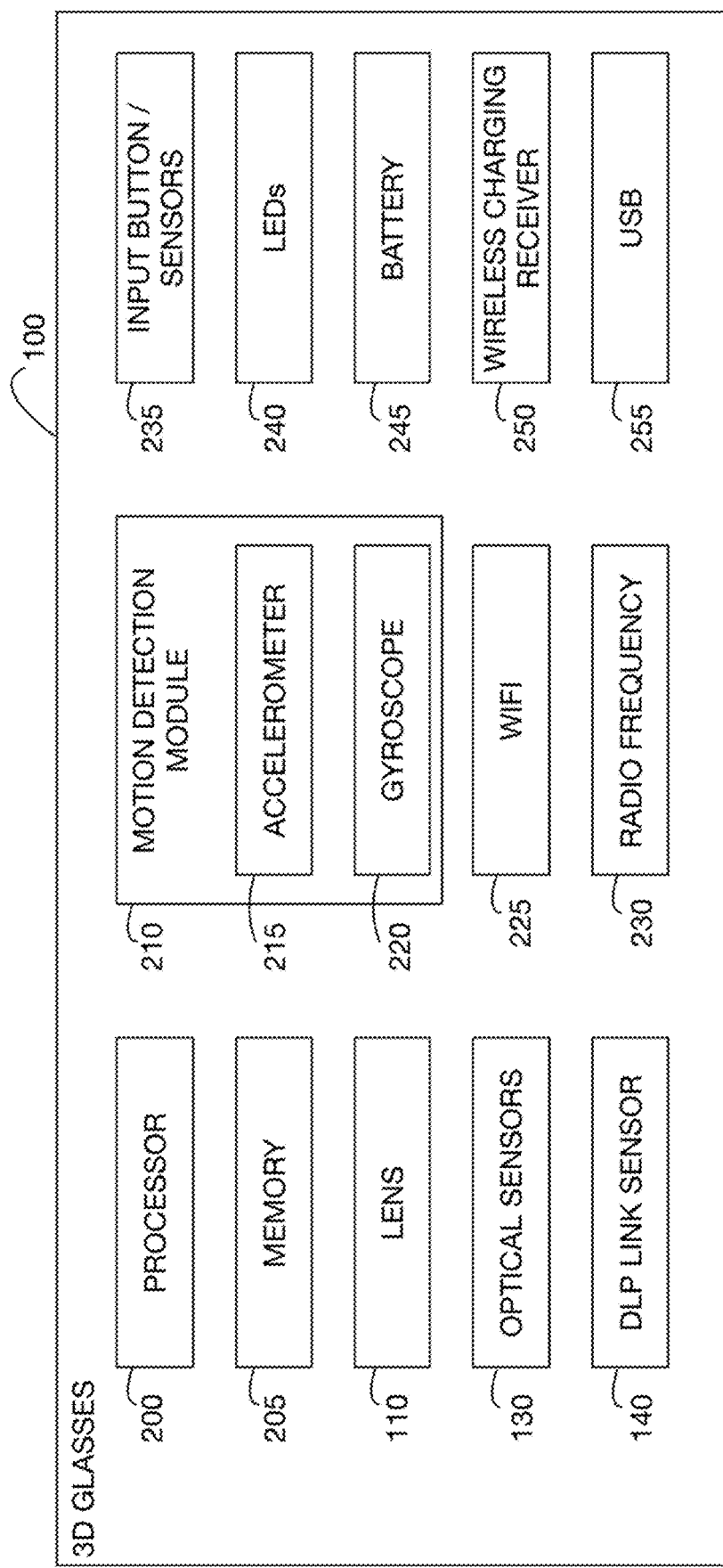
FIG. 2 illustrates exemplary components of the 3D glasses device, in accordance with an illustrative embodiment.

Turning to FIG. 2, a diagram is provided that illustrates exemplary components of a 3D glasses portion of the device 100, in accordance with one or more implementations of the present invention described herein. Depending on the functions and configurations of the 3D glasses device 100, the components may be altered to include more or fewer components inside the body of the 3D glasses. It should be appreciated and understood that each of the components described herein is capable of being interconnected to one another through one or more direct linkages, data or power busses, communication interfaces, input/out ports and the like. Fundamentally, to facilitate the tracking function of the 3D glasses, the device 100 may include a processor or computer 200 configured to execute code, a memory 205 configured to store code and data, a number of optical sensors 130, and a motion detection module 210. For instance, the processor 200 is configured by instructions stored in the memory 205 to execute programs or code, which may include, but are not limited to, executing tracking logics, and communication protocols with other devices, etc. The memory 205 provides the storage capacity, in the form of volatile and/or non-volatile memory, for storage of hardware and/or software related information and instructions. The optical sensors 130, as described above, provide tracking sample data to the processor 200 when they are activated by being struck by light from the optical transmitters. The motion detection module 210, in one configuration includes various types of motion-sensitive hardware components, such as accelerometer 215, and a gyroscope 220, etc. The accelerometer 215 measures the acceleration and gravity-induced reaction forces. The gyroscope 220 measures the orientation of the 3D glasses using principles of angular momentum. In a further implementation, the motion detection module 210 includes one or more magnetometers. By processing the various kinds of data obtained from the motion detection module 210 through the processor 200, the translation and rotation of the 3D glasses, in six degrees of freedom X-axis, Y-axis, Z-axis, pitch, roll, yaw, can be obtained.

The pair of lenses 110 included in the glasses filter light/image selectively to create various types of images that a user may view. The pair of lenses 110 can be defined by using either passive polarizers or active shutter LCD glasses. When a pair of passive polarizers, either circular or linear, are used, it is possible to provide left-eye and right-eye video content separately. As such, an improved immersive control can be achieved by creating stereoscopic content using the separate differentiated left-eye and right-eye viewing presentation. Alternatively, when polarizers in the same direction, for example using all horizontal polarizers in one embodiment, are used for both the left and the right eye, it is possible to further have a plurality of players in the immersive virtual reality system, each wearing a different pair of glasses. When a pair of active shutter LCD glasses is used, the stereoscopic viewing experience and the multiple player immersive virtual reality experience can be created in similar manner as using the passive polarizers. In such case, the open and close of the left-eye and right-eye shutter can be controlled to dictate the content of the left-eye and right-eye viewing presentation.

A number of communication modules may be included as shown in FIG. 2 to enable the 3D glasses 100 to interact with various external devices. In one embodiment, a WiFi module 225 may be included to enable the 3D glasses access to the Internet, both the local area network and the wide area network, through wireless networking technologies. In such a way the 3D glasses 100 may be able to interact with other networked clients without the need to go through a proxy networked device. In one embodiment, one or more radio frequency (RF) module(s) 230, either in the form of a Bluetooth module or other modules, such as one operating from 900 MHz to 3.2 GHz, enable the 3D glasses to communicate wirelessly with other devices. The radio frequency and/or Bluetooth module(s) 230 may also be used to communicate with an external radio frequency transmitter to synchronize the 3D signal format of the active shutter LCD lens. Alternatively, in one embodiment, the DLP Link sensor 140 may be used for synchronizing with a display system emitting DLP Link pulses to synchronize a 3D signal.

In various embodiments, input buttons/sensors 235 may be included to provide an input interface for the user. Various kinds of input interfaces, such as buttons, touch-pads, etc., may be included to provide such functionality. By way of non-limiting examples, such input interface may be used to power the device, activate a synchronization process or procedure with a display system, send one or more control signals to the computer 305, etc. LEDs 240 may be provided as visual indicators in revealing the status of various functions of the 3D glasses device 100. Examples of such status indicators include, but are not limited to battery level indication, power on/off indication, device operating mode indication, etc.

To supply the necessary energy to power the electrical components, such as the optical sensors 130, the processor 200, the motion detection modules 210, etc., a battery 245 may be provided as a power source to the 3D glasses device 100. In one particular configuration, the battery 245 is removable or replaceable. In another configuration, the battery 245 is integrated into the 3D glasses device. Alternatively, in other embodiments, the power source can include an outlet connection to a power supply. In still another embodiment, an outlet connection is provided to connect the described components to either an A/C power supply (such as though one or more connections to an electrical grid) and/or a battery 245. In this arrangement, power sufficient to operate the described components is jointly supplied by such power sources.

In one embodiment, a USB or other data interface 255 is included as an interface to charge up the battery 245. In other embodiments, the battery may also be charged up by means of wireless power transmission, in which a wireless charging receiver 250 can be included to receive power from an external wireless charging transmitter. In addition to acting as a power charging interface, the USB interface 255 may also be used as an interface for enabled connection of peripheral devices, or connection to other devices such as other portable devices, computers, etc. In various embodiments of the 3D glasses device 100, any of various kinds of interfaces may be included to enable greater connectivity of the 3D glasses device 100.

Figure 3A:
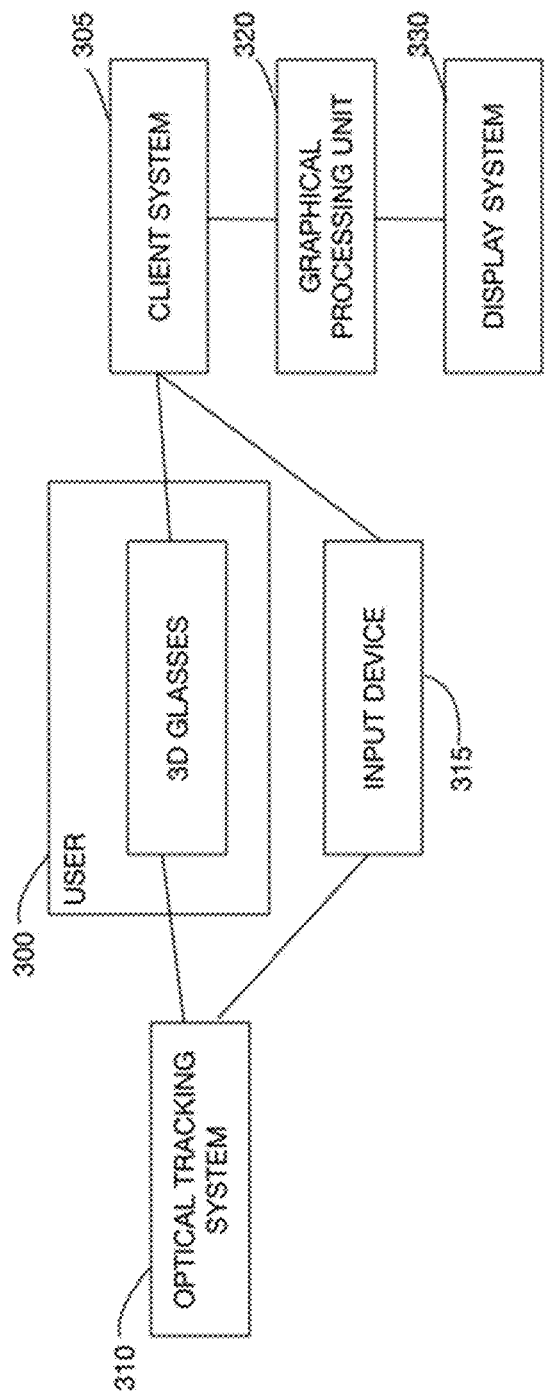
FIG. 3A illustrates an exemplary system for interactive gameplay of a video game using the 3D glasses device described herein.
Figure 3B:
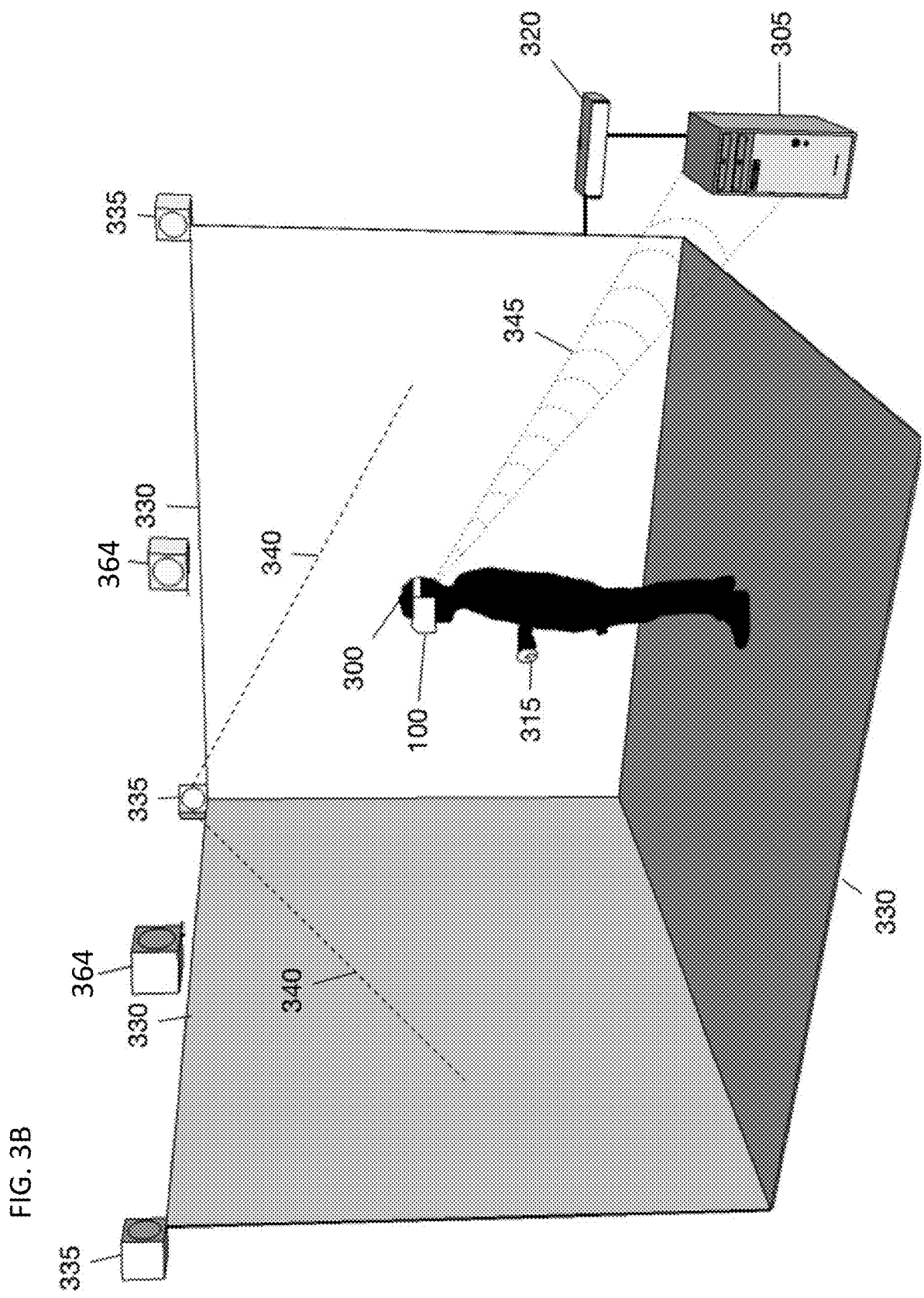
FIG. 3B further illustrates an exemplary system for interactive gameplay of a video game using the 3D glasses device described herein.

FIGS. 3A-B illustrate an exemplary system for interactive gameplay of a video game in accordance with an embodiment of the subject invention. A user 300 is indicated as wearing a 3D glasses device 100 configured as a head-mounted display in FIG. 3B. The 3D glasses device is configured to provide an immersive experience to the user by means of its tracking mechanisms, and the filtered display image the user sees through the pair of lens 110. (FIG. 1A) In one form, the user can see the physical environment with a projected image overlaid. Thus, the user can move about the space and enjoy the experience without bumping into actual physical objects. However, the amount of transparency can be controlled so that in one mode only the virtual space is visible.

In a particular configuration of FIG. 2B, the 3D glasses 100 are connected to a computer 305. The computer, herein referred to, may be any general or special purpose computing device, including but not limited to, a desktop computer, a laptop, a gaming console, a tablet computer, a mobile device, a smartphone, a tablet, etc. In one embodiment, the computer 305 can be configured to execute interactive digital media content. A video game is used here as an example, and the digital media content can be output to various types of display and audio apparatus. For clarity, the computer system may hereafter be referred as a "client system," which in the exemplary system illustrated in FIGS. 3A-B is a desktop computer.

The user 300 may operate an input device 315 to provide input for the video game. The input device may be any general or special purpose input apparatus, including but not limited to a controller, a keyboard, a mouse, a gearing wheel, etc. In addition, the input device 315 may also have a built-in tracking mechanism that is compatible with the virtual reality system, so that a better immersive experience can be provided to the user 300 by tracking the location of device 315 in the virtual environment.

In one example, an optical tracking system 310 (FIG. 3A) with optical transmitters 335 (FIG. 3B) can be configured to scan through the physical interactive environment in which the user 300 is located. With continued reference to FIGS. 3A-B, the user 300 is shown wearing the 3D glasses 100 being tracked using an optical tracking system featuring optical transmitters, in accordance with one embodiment. In the illustrated example, the 3D glasses device is tracked using signals 340 from optical transmitter 335 of the optical tracking system 310. The light emitted from the optical transmitters, is incident upon the optical sensors 130 on the 3D glasses and enables one or more processors to determine the location and orientation of the 3D glasses in substantially real-time during game play. With the utilization of optical transmitters 335 and optical sensors 130, the level of tracking accuracy is governed by the visibility of the optical sensors by the optical transmitters. More specifically, the 3D glasses can only be tracked when the 3D glasses' optical sensors are within the effective range of the optical transmitters, i.e. only when light emitted from the optical transmitters strikes and activates multiple optical sensors within one iteration of the optical transmitters' that are scanning the environment. In some embodiments, the user 300 wearing the 3D glasses 100 can only be tracked effectively when the user wearing the 3D glasses is directly facing and within the field of view of at least one of the optical transmitters, so multiple optical transmitters may be required to provide a good level of 360-degree tracking of the user 300 wearing the 3D glasses. As an alternative, sensors 130 can be located along the entire circumference of the 3D glasses device and its head band.

In a particular embodiment, the 3D glasses device 100 communicates with the client system 305 via radio frequency communication 230 (FIG. 2), for example, Bluetooth radio frequency. A communication link 345 may be established when the 3D glasses device 100 is paired with the client system 305. Through the communication link, the 3D glasses 100 may be able to synchronize with the client system 305 various types of status indicators of the 3D glasses device, the status indicators may include, but are not limited to, positional and orientation information, battery level, power on/off information, 3D glasses meta information, etc.

Continuing with the example of FIGS. 3A-B, the interactive digital media content rendered by the client system 305 can be made to display on various types of display systems 330, including but not limited to 3D-compatible television screen, 3D-ready projectors projected on a single wall or specialized projection screen, 3D-ready projector system projected on multiple walls or specialized projection screens, one or more large scale 3D-compatible display panels, etc. In the exemplary display system shown in FIGS. 3A-B, a display system 360 consisting of multiple display screens 330 arranged in the shape of a rectangular cube. In FIG. 3A only two walls and the bottom of the cube are shown. The system 360 is used to display rendered images and/or videos of the interactive digital media content, each showing contents from a single projector 364. FIG. 3B shows projectors 364 on top of the walls or displays 330 projection onto opposite walls (not shown). In this example, the rendered digital media content may be converted into 3D display format through a graphical processing unit 320, such as a graphics card, a video box, or any other graphical processing hardware capable of generating 3D video signals. The generated 3D media content may then be viewed in the display system providing the immersive experience through the pair of lens 110 on the 3D glasses 100. In some embodiments, a 3D signal transmission module, such as radio frequency module 230 and/or DLP Link signal sensor 140, may be required to facilitate the synchronization of 3D signals between the display system and the 3D glasses, in case the active shutter LCD glasses were used as the lens. As such, the 3D signal transmission module communicates the display system's 3D display format to the 3D glasses 100 through a communication medium which may include radio frequency communication, DLP Link pulse signal, infrared signal, or other communication mechanism supported by the client system and the 3D glasses. The transmitted 3D signal format may then be used to synchronize the opening and closing of the active shutter LCD lens to produce the desired viewing effect.

Thus, first the 3D glasses device allows the user to see through the lenses 110 so, as he or she moves about the virtual reality environment volume, they can avoid obstacles. Second, by using polarized lens or active shutter lenses, the user can experience 3D views of content shown on displays 330, thus having the physical environment overlaid with the virtual.

Figure 4A:
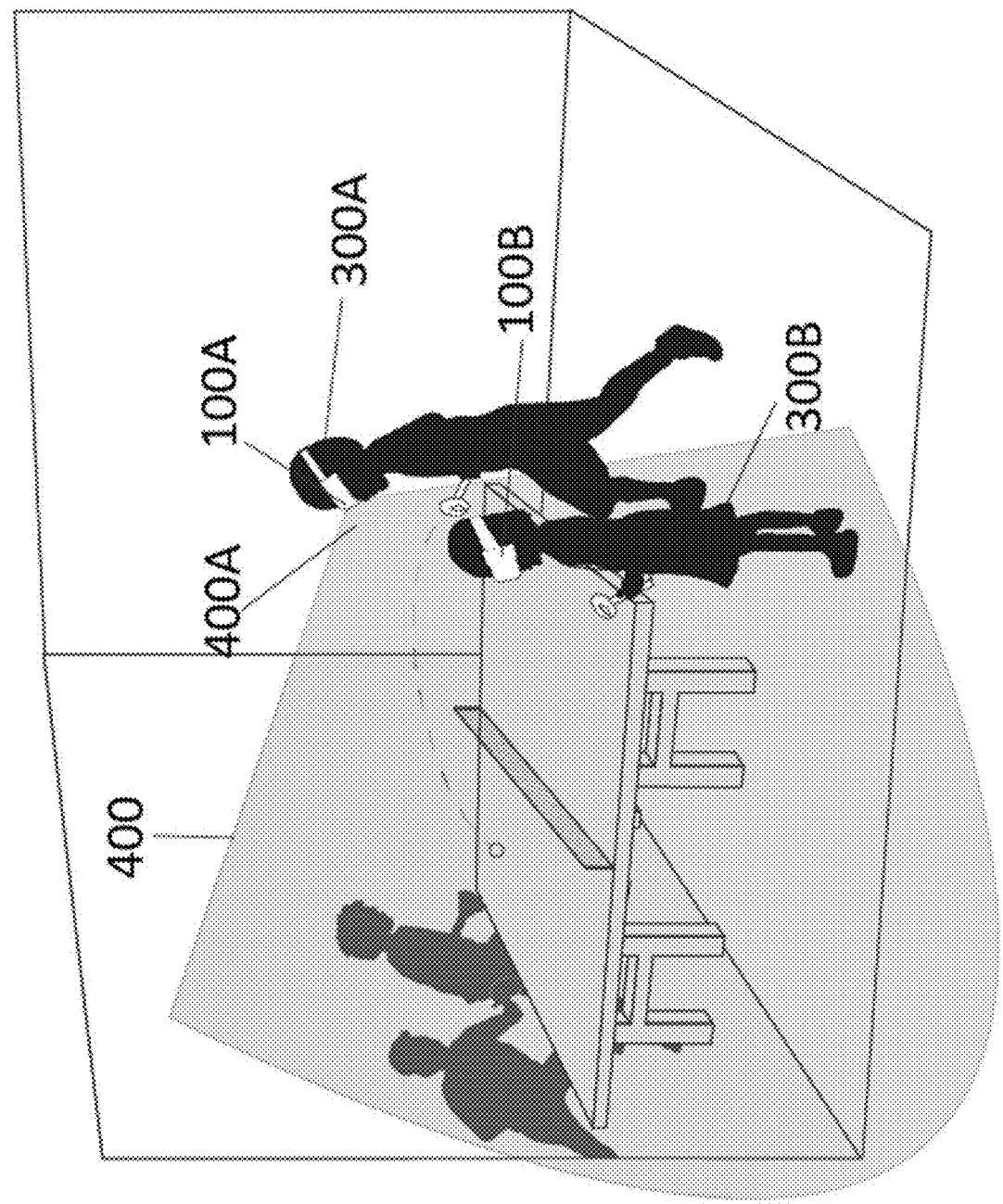
FIG. 4A illustrates exemplary interactive gameplay of a video game using the 3D glasses device described herein from the perspective of a first player only.
Figure 4B:
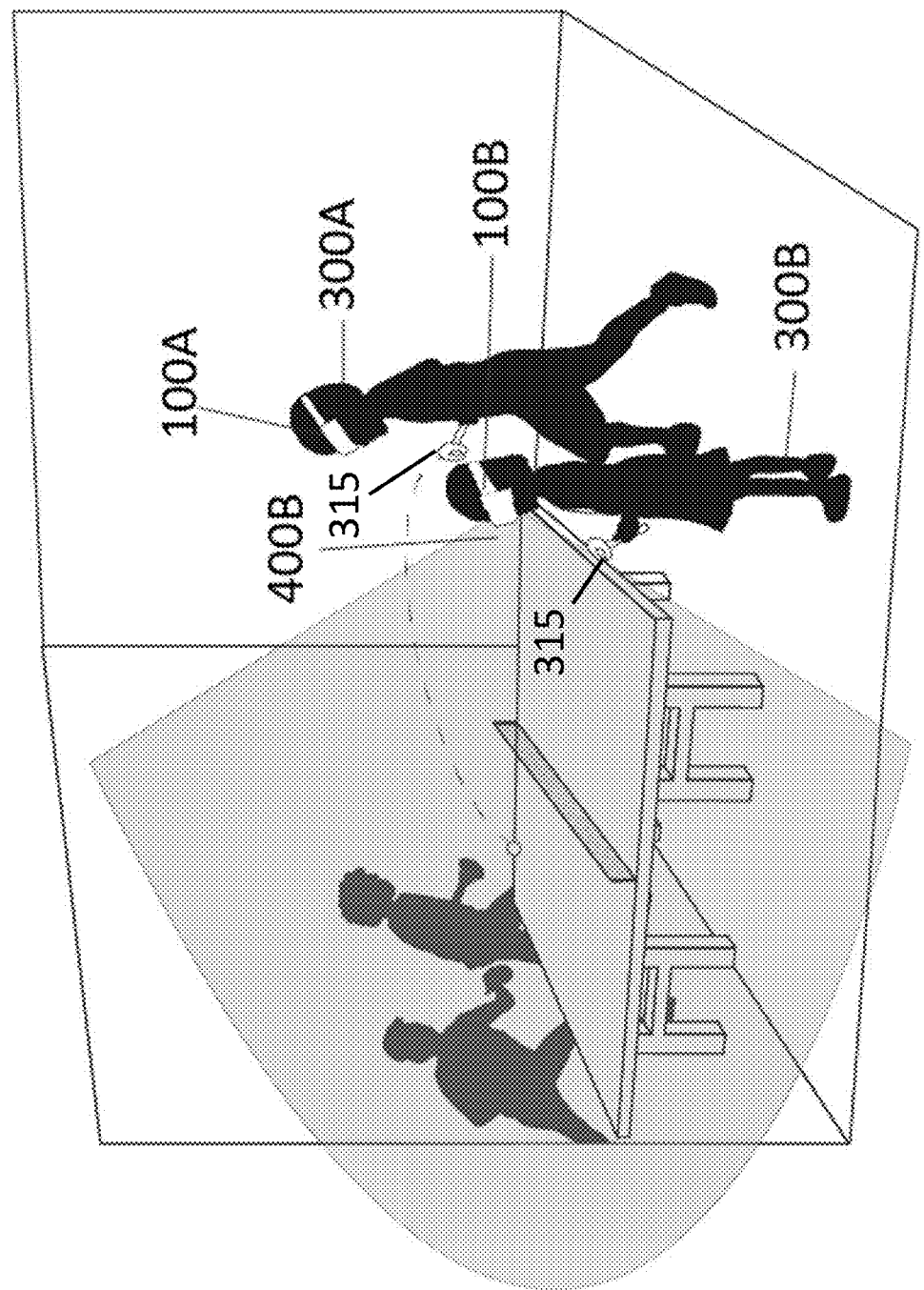
FIG. 4B illustrates exemplary interactive gameplay of a video game using the 3D glasses device described herein from the perspective of a second player and a first player.

As shown in FIG. 4A and FIG. 4B, another exemplary interactive gameplay of a video game in accordance with an embodiment of the subject invention is illustrated. As shown, a plurality of users 300 are wearing the 3D glasses 100 and are located within the same physical space. A first user 300A and a second user 300B are both wearing the 3D glasses 100 that are tracked simultaneously by the virtual reality system. Users 300 view the virtual reality gameplay image 400 through the 3D glasses 100. Using tracking information obtained from the 3D glasses 100A, the client system 305 renders the perspective virtual reality gameplay image 400A, oriented from the perspective of the first user 300A. A second user 300B wearing a second pair of 3D glasses 100B stands alongside the first user 300A. As illustrated in FIG. 4A, the second user may elect to share the perspective virtual reality gameplay image of the first user 400A by not sending tracking information of the second pair of 3D glasses 100B to the client system 305, hence only viewing images rendered from the orientation and perspective of the first user as a spectator to the interactive gameplay.

In an alternative configuration, as illustrated in FIG. 4B, the second user 300B may elect to send out tracking information to the client system 305, so that the client system may use such information to determine the position and/or orientation of the second user in the physical space shared with the first user 300A. Using this information, the client system is configured by one or more modules to render a perspective virtual reality gameplay image 400B. In a further implementation, the perspective virtual reality gameplay image is caused to be oriented from the perspective of the second user 300B. In such exemplary configuration, the virtual reality system may be capable of hosting a plurality of users in the same physical space, rendering perspective virtual reality gameplay images 400 for each player based on tracking information obtained from the 3D glasses 100 each player wore.

In various implementations, both users may submit input to the client system to interact with the virtual reality gameplay environment. For example, the second user may initiate a control action which moves a particular virtual object to another location in the gameplay environment. This can be achieved by placing a tracking device on the game paddle similar to device 315 in FIG. 3B. Movement of the paddle by the user can be part of player input. As another example, the first user may create or spawn a new virtual object in the gameplay environment. The client system, upon receiving the input action from the users, then renders the changes in the shared interactive virtual reality gameplay environment in their respective perspective views.

Figure 5A:
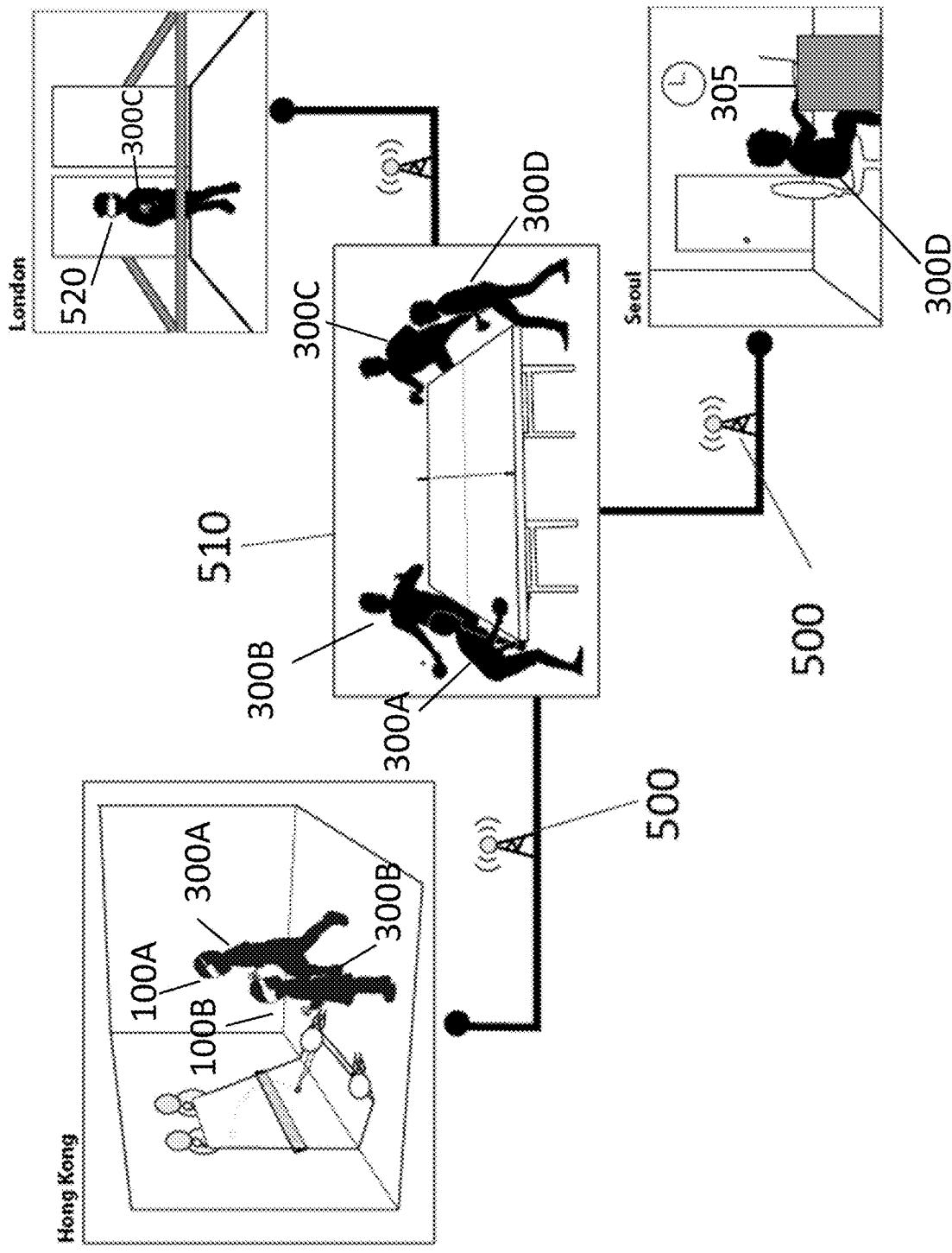
FIG. 5A illustrates exemplary shared interactive virtual reality gameplay session of four users at three different local or remote locations utilizing the same or different tracking 3D glasses, head mounted devices, or input device.
Figure 5B:
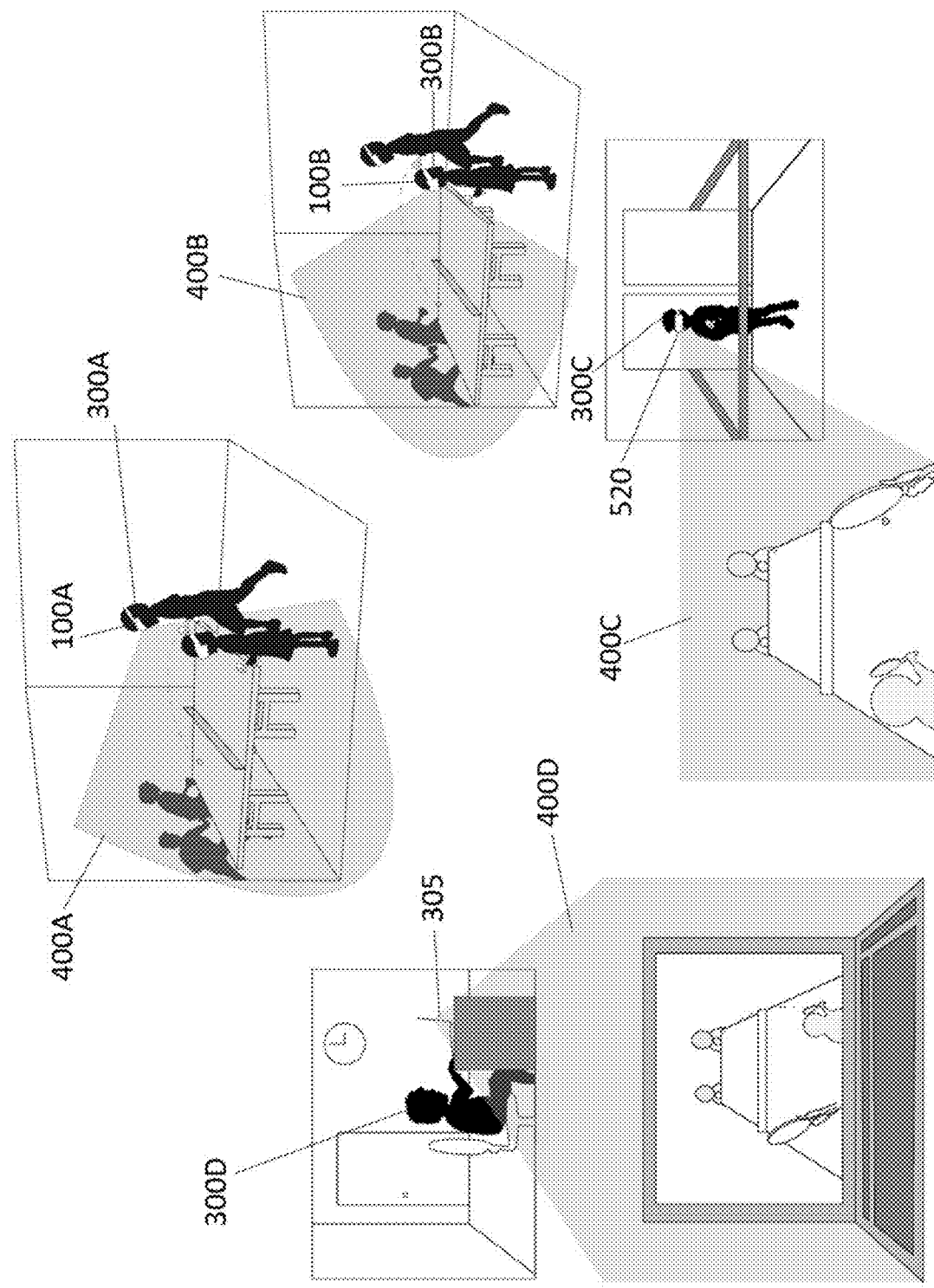
FIG. 5B illustrates exemplary shared interactive virtual reality gameplay session of four users at three different local or remote locations, each shown a perspective gameplay image rendered according to the tracking information of the users.

As illustrated in FIGS. 5A-B, in various configurations, a plurality of users can participate in the same interactive virtual reality gameplay while not necessarily in the same physical space or utilizing the same type of tracking or input devices. In an exemplary interactive virtual reality gameplay session, users may physically be present at various locations in the world, for example. Hong Kong, London, Seoul, New York, and engaged in the same interactive gameplay session through any computer network known in the art that interconnects the devices 500. In a particular gameplay session, a first user 300A and a second user 300B wearing 3D glasses 100A and 100B at a first location, for example, Hong Kong, may engage in an interactive cooperative gameplay session 510, with a third user 300C wearing some form of head mounted device 520 at a second location, for example, London, as well as a fourth user 300D using some form of computer 305, which can be a game console, a laptop, a tablet, at a third location, for example, Seoul.

Each user views the shared interactive gameplay session 510 from their own perspective. For example, the first user 300A and the second user 300B view perspective virtual reality gameplay image, 400A and 400B, rendered according to the tracking information sent from their respective 3D glasses 100A and 100B, and the third user 300C sees a perspective virtual reality gameplay image 400C rendered based on the tracking information obtained from the head mounted device 520 wore by the third user, while the fourth user 300D is shown a gameplay image in 2 dimensions with respect to the input signal submitted by the user. Each user may be shown a virtual representation of the other users in the same interactive gameplay session, in which the respective virtual representations would reflect the user's real-time position and orientation as submitted by their respective tracking or input device. The first user 300A may communicate with the other users 300B, 300C, 300D, via the computer network 500, and that allows all users to share resources in the same interactive gameplay session through communicate links. For example, the first user 300A may create a new virtual object in the shared interactive gameplay session (striking the ping pong ball), the action to create the new virtual object then transmits via the communicative network 500 as a signal, and broadcasts to the other users 300B, 300C, 300D. The client system of the other users, upon receiving the signal, execute the same action and renders a graphical representation of the shared interactive gameplay session in their respective displays.

In one or more configurations, the processors, computing elements and microprocessors described herein are connected, directly or indirectly, to one or more memory storage devices (memories). The memory is a persistent or non-persistent storage device that is operative to store an operating system for the processor in addition to one or more of software modules. In accordance with one or more embodiments, the memory comprises one or more volatile and/or non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. The computer memories may also comprise secondary computer memory, such as magnetic or optical disk drives or flash memory, that provide long term storage of data in a manner similar to the persistent memory device. In one or more embodiments, the memories of the processors provide for storage of application programs and data files when needed.

It will be further appreciated that computers, processors or computing devices described herein can communicate with the one or more remote networks using USB, digital input/output pins, eSATA, parallel ports, serial ports, FIREWIRE, Wi-Fi, Bluetooth, or other communication interfaces. In a particular configuration, computing devices, processors or computers provided herein may be further configurable through hardware and software modules so as to connect to one or more remote servers, computers, peripherals or other hardware using standard or custom communication protocols and settings (e.g., TCP/IP, etc.) either through a local or remote network or through the Internet. Computing devices, processors or computers provided herein may utilizes wired or wireless communication means, such as, but not limited to CDMA, GSM, Ethernet, Wi-Fi, Bluetooth, USB, serial communication protocols and hardware to connect to one or more access points, exchanges, network nodes or network routers.

The processors or computers described are configured to execute code written in a standard, custom, proprietary or modified programming language such as a standard set, subset, superset or extended set of JavaScript, PHP, Ruby, Scala, Erlang, C, C++, Objective C, Swift, C#, Java, Assembly, Go, Python, Pearl, R, Visual Basic, Lisp, or Julia or any other object oriented, functional or other paradigm based programming language.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to various known systems maybe cited throughout this application, the disclosures of which are incorporated herein by reference. Citation of any publications or documents is not intended as an admission that any of them is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details Although the foregoing invention has been described in detail for purposes of clarity of understanding, it will be apparent that certain changes and modifications can be practiced within the scope of the appended claims. Accordingly, the present embodiments are to be considered as illustrative and not restrictive, and the invention is not to delimit to the details given herein but may be modified within the scope and equivalents of the appended claims.

What is claimed is:

1. A 3D glasses device comprising:
a frame attachable to a user's face;
a pair of lenses supported by the frame front face cover and comprising left and right 3D transparent medium, whereby a user may selectively view the physical environment with a 3D image overlaid;
a processor within the frame and configured to execute programming instructions;
a memory within the frame and configured to store information and instructions for the processor;
at least one sensor embedded within the frame that provides an output of positional and orientation information when the 3D glasses device moves in a tracked environment scanned by transmitters;
wherein the processor is configured to operate the lenses to provide 3D scene rendering in response to (a) received motion detections signals based on the output of said at least one sensor and (b) 3D signal synchronizations signals based on 3D content signals and sensor output signals.

2. The 3D glasses device of claim 1 wherein the pair of lens comprises passive circular or linear polarizers in different directions to filter out images intended for the left eye and right eye.

3. The 3D glasses device of claim 1 wherein the pair of lens comprises active shutter LCD glasses configured to open and close in an alternating pattern at a refresh rate sufficient to cause a user to perceive separate images intended for the left eye or the right eye.

4. The 3D glasses device of claim 1 wherein the sensor signals are provided to the processor and further comprising a communication module for communicating data, including sensor signals, from the processor to at least one other remote device via a network.

5. The 3D glasses device of claim 1 further comprising at least one input component for receiving input from the user wearing the 3D glasses device, said input component including a sensor so the component can be tracked in the environment.

6. The 3D glasses device of claim 1 wherein the sensor senses positional and orientation data based on movement of the 3D glasses on an X-axis, Y-axis, Z-axis, pitch, roll, and yaw.

7. The 3D glasses device of claim 1 wherein the processor is configured by at least one calibration module that causes data relating to the configuration of one or more sensors to be stored within the memory of the 3D glasses.

8. The 3D glasses device of claim 1, wherein the processor is adapted to communicate with a remote client computing system configured to communicate with the 3D glasses device, wherein a computer of the client computing system is configured by at least one absolute calibration module that causes data relating to a pre-defined environment to be compared to the sensor data generated by the 3D glasses device to determine at least one data value relative to the location of the 3D glasses device within the pre-defined tracked environment.

9. The 3D glasses device of claim 1 wherein the processor of the 3D glasses device is configured to receive, from a remote data storage device one or more data updates to at least one module stored in the memory.

10. The 3D glasses device of claim 1 further including a power source within the frame for supplying energy to the processor, sensor and lenses as necessary.

11. A system, comprising,
a client computing system having at least one processor, a communication interface and a memory;
an optical tracking system, configured to scan a physical environment with series of light waves in iterations during a session of use;
a display system, having one or more display screens;
at least one 3D glasses device in communication with the client system, the at least one 3D glasses device including:
1. a pair of lens configured so as to allow a wearer to view digital media content having a plurality of fields of view and rendered by the client system and displayed on the display system;
2. a real-time tracking unit comprising at least one optical light sensor configured to output a signal in response to light incident thereupon from the optical tracking system,
3. a processor and a memory, and
4. a motion detection module; and
wherein the client system is configured to receive from a data storage location digital media content and render the digital media content based, at least in part, on the position and orientation of the 3D glasses device as determined using the optical light sensor and motion detection module, a portion of the rendered digital media content display being viewed by the user wearing the 3D glasses device based on at least the position and orientation of the 3D glasses.

12. The system of claim 11 wherein the lenses of the 3D glasses device are differently polarized filters for each eye so as to display stereoscopic digital media content.

13. The system of claim 12 wherein the pair of lens is defined by a set of polarizers having one of a circular or linear pattern.

14. The system of claim 13 wherein the set of polarizers includes polarizers in different directions for the left eye and the right eye.

15. The system of claim 11 wherein the display system employs an active stereo technique through time-sequential shuttering to display stereoscopic digital media contents.

16. The system of claim 15 wherein the pair of lens is defined by a set of active shuttering liquid-crystal displays configured to open and close the shutter for the left eye and right eye alternately.

17. The system of claim 16 further comprising a 3D signal synchronization module configured to communicate the display system's 3D display format to the 3D glasses device to control the shuttering of the left eye and right eye lens.

18. The system of claim 11 wherein the display system comprises a plurality of display screens, each configured to display a portion of the rendered digital media content.

19. The system of claim 18 further comprising a graphical processing unit configured to fragment the rendered digital media content for distribution to various display screens and synchronize 3D display signals among the display screens.

20. The system of claim 11 wherein the client system receives tracking information from a plurality of head mounted devices.

21. The system of claim 20 wherein the images seen by each head mounted device differs in perspective according to the position and orientation of each head mounted device.

* * * * *